(12) United States Patent
Horii

(10) Patent No.: US 8,930,323 B2
(45) Date of Patent: Jan. 6, 2015

(54) TRANSACTION PROCESSING SYSTEM, METHOD, AND PROGRAM

(71) Applicant: International Business Machines Corporation, Armonk, NY (US)

(72) Inventor: Hiroshi Horii, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 265 days.

(21) Appl. No.: 13/629,728

(22) Filed: Sep. 28, 2012

(65) Prior Publication Data

US 2013/0086018 A1   Apr. 4, 2013

(30) Foreign Application Priority Data

Sep. 30, 2011   (JP) .................................. 2011-218145

(51) Int. Cl.
*G06F 17/30* (2006.01)
(52) U.S. Cl.
CPC .... *G06F 17/30371* (2013.01); *G06F 17/30362* (2013.01)
USPC .......................................... 707/687; 707/703
(58) Field of Classification Search
CPC .................. G06F 17/30371; G06F 17/30575; G06F 17/30348; G06F 17/30351; G06F 17/30353; G06F 17/30362; G06F 17/30377; G06F 17/3089; G06F 17/30893; G06F 17/30368; G06F 17/30578; G06F 17/30327; G06F 17/30949
USPC .................................................. 707/687, 703
See application file for complete search history.

(56) References Cited

U.S. PATENT DOCUMENTS

| | | | |
|---|---|---|---|
| 5,408,653 A | 4/1995 | Josten et al. | |
| 5,557,792 A | 9/1996 | Josten et al. | |
| 5,761,660 A | 6/1998 | Josten et al. | |
| 7,206,805 B1* | 4/2007 | McLaughlin, Jr. | 709/203 |
| 7,831,574 B2* | 11/2010 | Pareek et al. | 707/703 |
| 2002/0083078 A1* | 6/2002 | Pardon et al. | 707/104.1 |
| 2010/0106697 A1 | 4/2010 | Enoki et al. | |

FOREIGN PATENT DOCUMENTS

| | | |
|---|---|---|
| CN | 102165420 A | 8/2011 |
| EP | 2352090 A1 | 8/2011 |
| JP | 1994-083692 | 3/1994 |
| JP | 1996-202567 A | 8/1996 |
| JP | 2007-188518 A | 7/2007 |
| KR | 2011-0066940 A | 6/2011 |
| WO | WO2010/041515 A1 | 4/2010 |

* cited by examiner

*Primary Examiner* — Apu Mofiz
*Assistant Examiner* — Fariborz Khoshnoodi
(74) *Attorney, Agent, or Firm* — Vazken Alexanian

(57) ABSTRACT

Using a KVS transaction processing mechanism, four lock states are managed. When a local transaction refers to and updates a map entry, the local transaction is graded up to a global transaction. Start processing as the global transaction is first performed to determine a transaction ID. A committed value, a value being updated, and a transaction ID being updated are then inserted into all map entries for which LX locks are being acquired at present. Another local transaction is then started for all map entries for which S locks are being acquired at present to acquire S locks. Next, the original local transaction is committed. As a result, the LX locks acquired are graded up to GX locks. After the termination of the global transaction as the waiting target, acquisition of S locks (GX locks) is tried as a global transaction.

12 Claims, 17 Drawing Sheets

TRANSACTION PROCESSING SYSTEM, METHOD, AND PROGRAM

CROSS-REFERENCE TO RELATED APPLICATION

This application claims priority under 35 U.S.C. §119 from Japanese Patent Application No. 2011-218145 filed Sep. 30, 2011, the entire contents of which are incorporated herein by reference.

BACKGROUND OF THE INVENTION

1. Field of the Invention

This invention relates to a distributed processing system, particularly to transaction processing on the distributed database system, and more particularly to transaction processing in a Key-Value Store (hereinafter abbreviated as KVS) system.

2. Description of Related Art

The distributed database system is widely known. For example, Japanese Patent Application Publication No. 2007-188518 discloses a distributed database system using ownership groups, in which a step of changing data indicative of the ownership of data items is an atomic operation.

The distributed database system typically implements a relational database and uses query syntax such as SQL.

More recently, database management software called a key-value store (KVS) to write a value by associating a key to the value and read a value by specifying a key associated the value has been used. The features of the simple interface cause high throughput for reading and writing value and high scalability according to the number of servers. Therefore, a distributed KVS capable of distributing data to multiple servers has also been implemented.

In the distributed database system, a distributed transaction using two-phase commit is generally processed. The transaction state is managed by each resource manager and transaction monitor to achieve a transaction across multiple distributed resources. However, if such a mechanism is introduced into a KVS, the simple attribute of the KVS will be lost, resulting in impairing management convenience and scalability. Therefore, it is not preferred to apply, to a distributed KVS, a technique for using a distributed lock manager to achieve a global transaction as disclosed in Japanese Patent Application Publication (Translation of PCT Application) No. 2009-525536. Therefore, in a common distributed KVS, it is required that a client can request only a transaction (local transaction) in each server and a transaction for data managed by multiple servers should be processed to achieve a distributed transaction (global transaction) by combining local transactions.

However, in a transaction distributed KVS simply implemented, no global transaction can be achieved. For example, when one client computer makes a request to two servers for two local transactions to compose one global transaction, if a failure occurs in the client computer after committing one of the local transactions on the server, it cannot be determined whether the other local transaction on the server can be committed.

Therefore, a method for coordinating a global transaction with local transactions on Google App Engine is disclosed in *Slim3 on Google App Engine for Java: Development of cloud applications with Slim3*, Yasuo Higa and Shinich Ogawa, Shuwa System Co. Ltd., pp. 241-251. In this method, on KVS, a management map is defined as a special map to manage all of global transactions and data maps are defined by application as maps to store not only committed value, but also dirty value being updated with IDs of updating global transactions. The management map manages which global transactions were committed or not as the transaction monitor in the two-phase commit mechanism, and data maps manage which data is prepared to be committed as the resource manages in the two-phase commit mechanism, thereby they realize the same function as the two-phase commit on a distributed KVS that supports only local transactions. The concurrency of the data operations are controlled by transaction IDs in the data maps and the global transaction states in the management map. In other word, in the concurrency control mechanism, concurrency control mechanism (local concurrency control mechanism) for local transactions provided by the KVS is never used.

When a global transaction on a distributed KVS is realized by such a conventionally known technique, a global transaction and a local transaction cannot be mixed because the concurrency control mechanism for local transactions does not work with a concurrency control mechanism for global transactions. For example, when a client computer is updating values managed by two servers with coordinating a global transaction to atomically update them, the other client can read and update the values which are being updated in a local transaction because the concurrency control for the global transaction doesn't acquire any locks from local concurrency control mechanisms of servers on KVS.

Thus, even processing that will do with a local transaction in the technique conventionally known needs to be performed by a global transaction. Since the global transaction has overhead larger than the local transaction, there has been a problem of reducing the processing speed.

SUMMARY OF THE INVENTION

One aspect of the present inventions provides a method for distributing data to a plurality of servers on which data is accessed from a client computer, the method including: placing, on each of the plurality of servers, a management table including a transaction ID and a value indicative of a state thereof, and a data table including a key value, a value, and a lock value; determining a transaction ID on the client computer to start a global transaction; starting a query local transaction on a server processing a local transaction among the plurality of servers; running a query in the query local transaction about all values being referred to in the local transaction; updating all values being updated in the local transaction to a combination of a value before being updated, a value being updated, and the transaction ID as a lock value on the data table; and committing the local transaction Another aspect of the present invention provides a non-transitory computer program product for a distributed KVS system distributing data to a plurality of servers on which the data is accessed from a client computer, the computer program product causing the distributed KVS system to execute: placing, on each of the plurality of servers, a management table including a transaction ID and a value indicative of a state thereof, and a data table including a key value, a value, and a lock value; determining a transaction ID on the client computer to start a global transaction; starting a query local transaction on a server processing a local transaction among the plurality of servers; running a query in the query local transaction about all values being referred to in the local transaction; updating all values being updated in the local transaction to a combination of a value before being updated, a value being updated, and the transaction ID as a lock value on the data table; and committing the local transaction.

Another aspect of the present invention provides a system, having a processor and memory, for a distributed KVS system distributing data to a plurality of servers on which the data is accessed from a client computer, the system including: means for placing, on each of the plurality of servers, a management table including a transaction ID and a value indicative of a state thereof, and a data table including a key value, a value, and a lock value; means for determining a transaction ID on the client computer to start a global transaction; means for starting a query local transaction on a server processing a local transaction among the plurality of servers; means for running a query in the query local transaction about all values being referred to in the local transaction; means for updating all values being updated in the local transaction to a combination of a value before being updated, a value being updated, and the transaction ID as a lock value on the data table; and means for committing the local transaction.

DETAILED DESCRIPTION OF THE PREFERRED EMBODIMENTS

Figure 1:
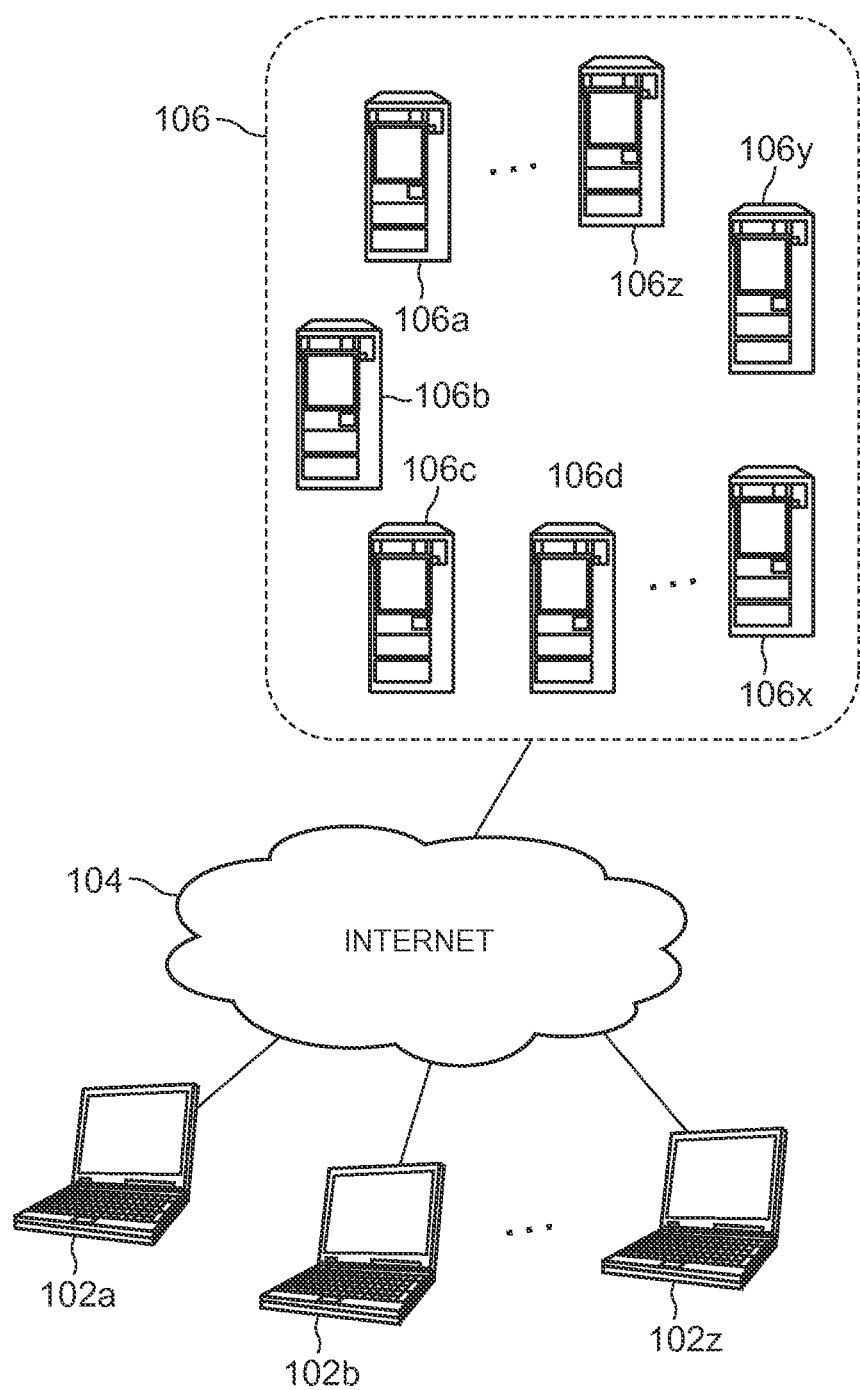
FIG. 1 is a schematic diagram of a system for carrying out one embodiment of the present invention.

A preferred embodiment of the present invention will now be described with reference to the accompanying drawings. Throughout the drawings, the same reference numerals denote the same targets unless otherwise noted. It should be noted that the following description is one preferred embodiment of the present invention and this invention is not limited to the content described in this embodiment.

FIG. 1 is a schematic diagram showing a system for carrying out the present invention. In FIG. 1, multiple client computers 102*a*, 102*b*, . . . , 102*z* access a distributed processing system 106 through the Internet 104 according to a protocol such as HTTP.

The distributed processing system 106 has multiple servers 106*a*, 106*b*, . . . , 106*z* interconnected via LAN, WAN, or the like. The distributed processing system 106 is a system for creating a distributed database by using a key-value store (KVS). In other words, ID is assigned to each of the servers 106*a*, 106*b*, . . . , 106*z*, and a hash value mod for a key is preferably calculated (though not limited to this method) to uniquely determine a server holding the key.

Thus, any of the servers 106*a*, 106*b*, . . . , 106*z* to be accessed by each of the client computers 102*a*, 102*b*, . . . , 102*z* is determined by the key to be referred to. It is preferred that one of the servers 106*a*, 106*b*, . . . , 106*z* be a server called a catalog server on which keys stored on the other servers and other information are so stored that each of the client computers 102*a*, 102*b*, . . . , 102*z* will once access the catalog server to acquire information for determining which of the servers 106*a*, 106*b*, . . . , 106*z* the client computer is to access in order to establish a connection with the server instructed. Alternatively, a method for broadcasting from any server accessed by the client computer to the other multiple servers to acquire the information can also be employed. For convenience sake, the following will describe a case after a target server is found and a connection is established.

Each of the client computers 102*a*, 102*b*, . . . , 102*z* generates a unique global transaction ID to access the distributed processing system 106, and uses the global transaction ID for subsequent transactions with the distributed processing system 106.

Figure 2:
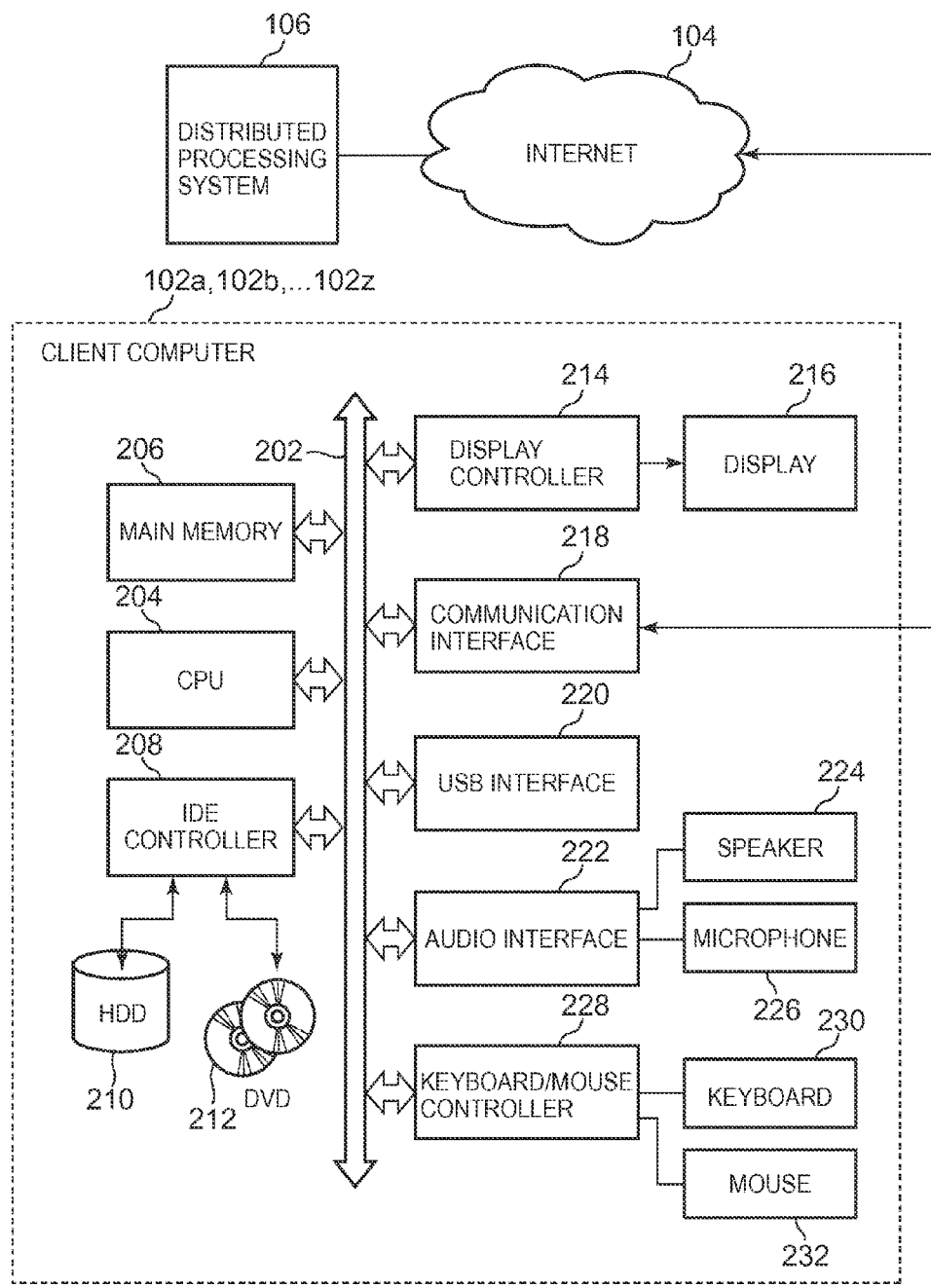
FIG. 2 is a schematic block diagram of the hardware of a client computer according to one embodiment of the present invention.

Referring next to FIG. 2, a hardware configuration of the client computer as indicated by reference numerals 102*a*, 102*b*, . . . , 102*z* in FIG. 1 will be described. In FIG. 2, the client computer has a main memory 206, a CPU 204, and an IDE controller 208, and these components are connected to a bus 202. A display controller 214, a communication interface 218, a USB interface 220, an audio interface 222, and a keyboard/mouse controller 228 are also connected to the bus 202. A hard disk drive (HDD) 210 and a DVD drive 212 are connected to the IDE controller 208. The DVD drive 212 is used to introduce a program from a CD-ROM or a DVD as necessary. A display device 216 having an LCD screen is preferably connected to the display controller 214. An application screen is displayed on the display device 216 through a Web browser.

A device such as an extended hard disk drive can be connected to the USB interface 220 as necessary.

A keyboard 230 and a mouse 232 are connected to the keyboard/mouse controller 228. The keyboard 230 is used to type key data or a password to conduct searching.

The CPU 204 can be of any type based, for example, on a 32-bit architecture or a 64-bit architecture, and Intel Pentium (registered trademark of Intel Corporation) 4, or Core (registered trademark) 2 Duo, or AMD Athlon (trademark), or the like can be used.

At least an operating system and a client-side program 402a (FIG. 4) for accessing the distributed processing system 106 are stored in the hard disk drive 210. The operating system is loaded into the main memory 206 upon system start-up. Windows XP, Windows Vista, Windows 7, Linux, or the like can be used as the operating system. The client-side application program 402a will be described in detail later with reference to a block diagram of FIG. 4 and flowcharts of FIG. 9 to FIG. 14.

The communication interface 218 uses the TCP/IP communication function provided by the operating system to communicate with the distributed processing system 106 through the Internet 104 under the Ethernet protocol or the like.

Figure 3:
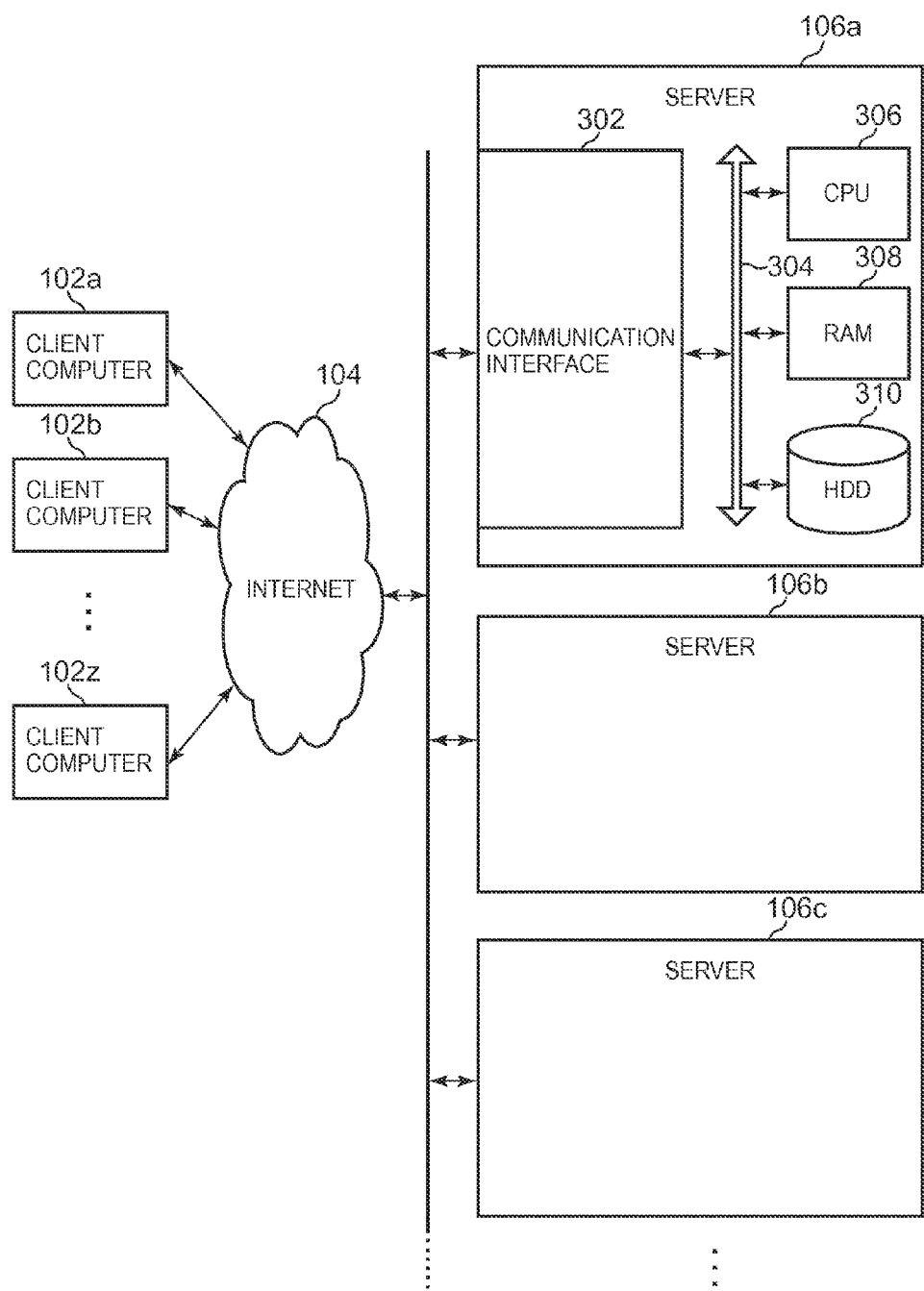
FIG. 3 is a schematic block diagram of the hardware of a server according to one embodiment of the present invention.

FIG. 3 is a schematic block diagram of a hardware configuration of the server 106a or the like in the distributed processing system 106. As shown, the servers 106a, 106a, . . . , 106z are connected through the Internet 104. Since the servers 106a, 106a, . . . , 106z basically have the same configuration, the server 106a is shown here as the representative of the servers. As shown in FIG. 3, the client computers 102a, 102b, . . . , 102z are connected to a communication interface 302 of the server 106a via the Internet 104. The communication interface 302 is further connected to a bus 304, and a CPU 306, a main memory (RAM) 308, and a hard disk drive (HDD) 310 are connected to the bus 304.

Though not shown, a keyboard, a mouse, and a display can also be connected to the server 106a so that the maintenance staff will use these components to work on the general management and maintenance of the server 106.

An operating system is stored in the hard disk drive 310 of the server 106a.

In the hard disk drive 310, software such as Apache for causing the server 106a to function as a Web server, Java EE for implementing a Java virtual environment, and an application program 402a according to the present invention to be described later, which runs on the Java virtual environment, are also stored. These software programs are loaded into the main memory 308 upon startup of the server 106a and executed. This enables the client computers 102a, 102b, . . . , 102z to access the server 106 by the TCP/IP protocol.

Further, in the hard disk drive 310 of the server 106a, software for implementing a KVS such as IBM(R) WebSphere eXtreme Scale is stored. In addition, in the hard disk drive 310, a transaction processing program 406a (FIG. 4) for a KVS according to the present invention is stored. The function of this transaction processing program 406a will be described in detail later with reference to the block diagram of FIG. 4 and the flowcharts of FIG. 9 to FIG. 14.

As the above server 106a, a server model, such as IBM System X, System i, or System p, available from International Business Machines Corporation, can be used. Examples of usable operating systems in this case include AIX, UNIX, Linux, Windows 2003 Server, and the like.

Figure 4:
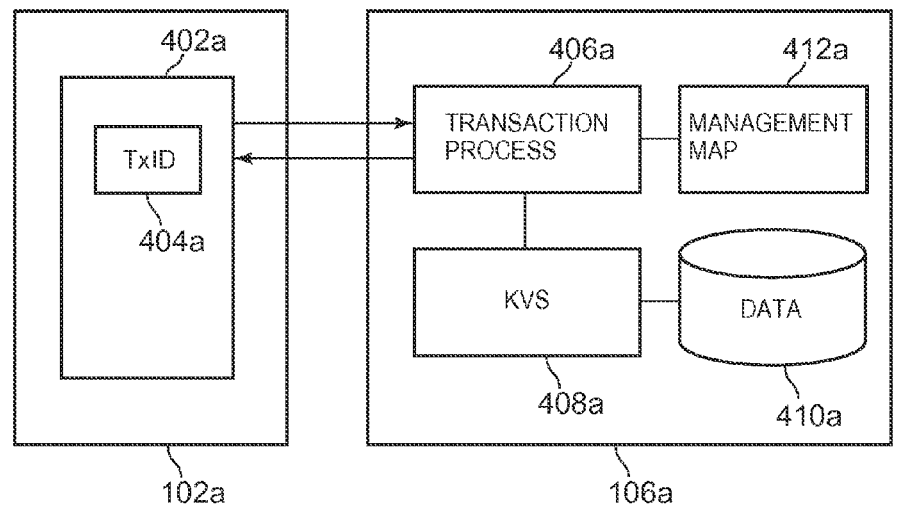
FIG. 4 is a functional block diagram of a client computer and a server according to one embodiment of the present invention.

FIG. 4 is a schematic block diagram showing processing programs in each of the client computers 102a, 102b, . . . , 102z and each of the servers 106a, 106b, . . . , 106z, respectively. Here, the client computer 102a and the server 106a are shown as the representative of the client computers and the servers.

The application program 402a on the client computer side is stored in the hard disk drive 210, loaded into the main memory 202 and executed with user's predetermined operations on the client computer, having the functions of giving instructions from the client computer to a KVS system on the server, such as transaction startup, data query, data updating, commit, and transaction termination.

The application program 402a has a function 404a to generate a unique global transaction ID (TxID) within the entire system. As one example of the method for generating the global transaction ID, an ID unique to each of the client computers 102a, 102b, . . . , 102z and the servers 106a, 106b, . . . , 106z is so given that, each time each client computer starts a transaction, the ID of the client computer plus a serial number incremented on the client computer will be set as the global transaction ID. However, any other method for setting a unique global transaction ID within the entire system can also be used.

Although the application program 402a can generate the global transaction ID to access the server 106a, it can also generate other global transaction IDs to access multiple servers at the same time in order to process multiple global transactions.

In the hard disk drive 310 of the server 106a, the transaction processing program 406a, a KVS program 408a such as IBM(R) WebSphere eXtreme Scale, and key-value pairs to be referred to by the KVS program 408a are stored. The transaction processing program 406a and the KVS program 408a are loaded into the main memory 308 to run upon startup of the server 106a.

In response to a request accompanied with a transaction ID of a global transaction from the client computer 102a, the transaction processing program 406a controls the KVS program 408a to perform processing that involves acquiring a lock for a map entry, processing for a commit or a rollback, and preferably create, in the main memory 308, a management map 412a having entries including global transaction IDs, status, and queued global transaction IDs and maintain the management map 412a for each server.

Before the configuration and operation of a KVS system according to the present invention are described, the configurations and operations of some typical conventional KVS systems will be described. It will be contemplated that the features of the system according to the present invention will be made clearer by reference to these conventional systems.

Figure 5:
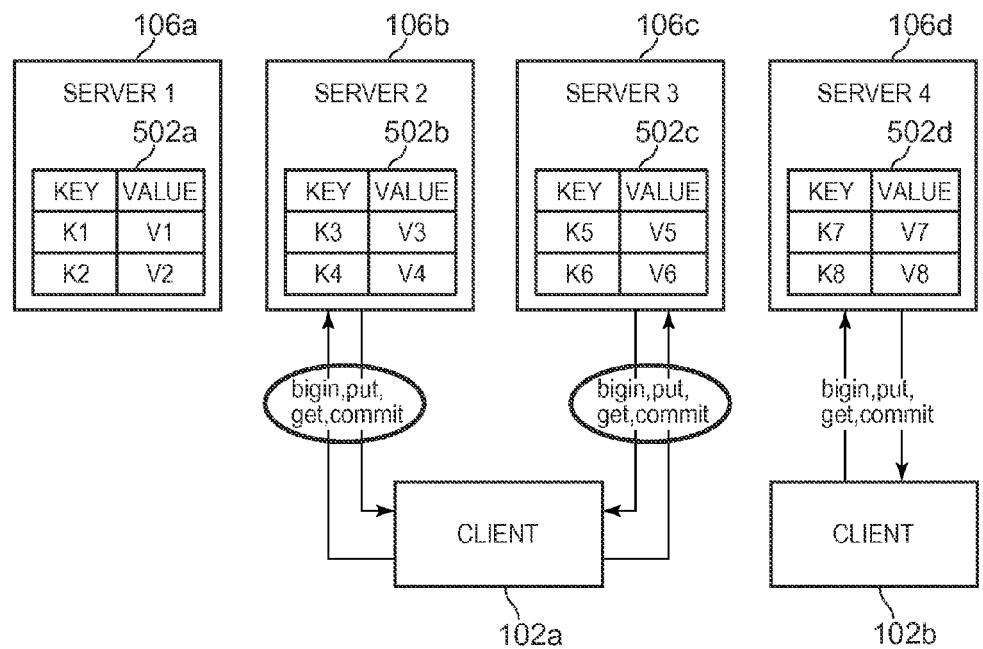
FIG. 5 is a diagram showing an outline of a conventional KVS system according to one embodiment of the present invention.

FIG. 5 is a diagram showing the configuration of a typical conventional KVS. Here, again, the KVS is configured such that data is divided into data 502a, 502b, 502c, and 502d as shown and distributed to multiple servers 106a, 106b, 106c, and 106d. A client computer 102b makes a request to one server for transaction processing, but like the client computer 102a, the client computer 102b can also make requests to two servers for transaction processing. In this case, data are so distributed that any two data sets will be disjoint. It is preferred that each server on which data is placed should decide on the data by calculating a hash value mod for a key.

The client computers 102a and 102b send commands, such as begin (begin a transaction), put (associate a key and a value), get (acquire a value associated with a key), and commit (make an update persistent), to a server uniquely determined by the key to make a request for processing.

Figure 6:
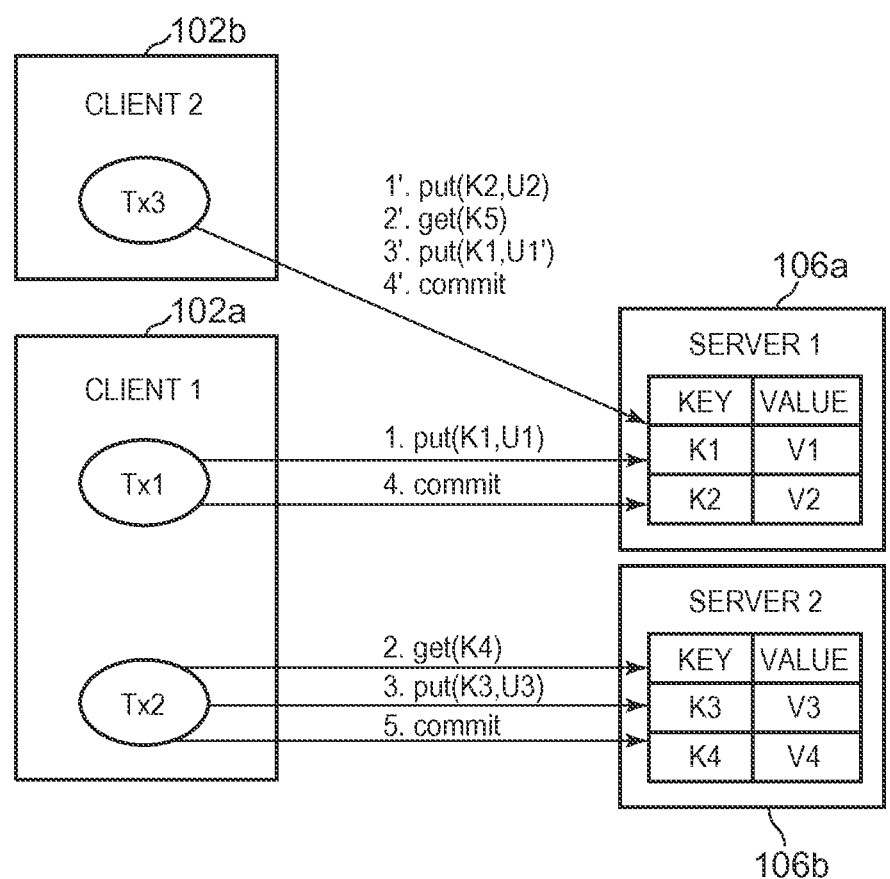
FIG. 6 is a diagram showing an example of processing performed by the conventional KVS system according to one embodiment of the present invention.

FIG. 6 is a diagram showing an example of transaction processing between the client computer 102a and the client computer 102b, and the server 106a and the server 106b in the typical conventional KVS system. Tx1, Tx2, and Tx3 are transaction IDs of local transactions, respectively. In this example, client 1, i.e., the client computer 102a instructs, server 1, i.e., the server 106a, to execute put(K1, U1) on the data map, instructs server 2, i.e., the server 106b to execute put(K3, U3) on the data map after executing get(K4) on the data map, instructs server 1 to execute a commit, and then instructs server 2 to execute a commit.

On the other hand, client 2, i.e., the client computer 102b instructs server 1 to perform processing on the data map to execute put(K2, U2), get(K5), put(K1, U1'), and commit sequentially in this order.

In this case, if a failure occurs in client 1 before commit processing on server 2 after server 1 completes a commit in the commit processing, since server 2 cannot determine whether to commit the transaction, client 1 cannot atomically update K1 and K3 and hence the global transaction cannot be realized.

Figure 7:
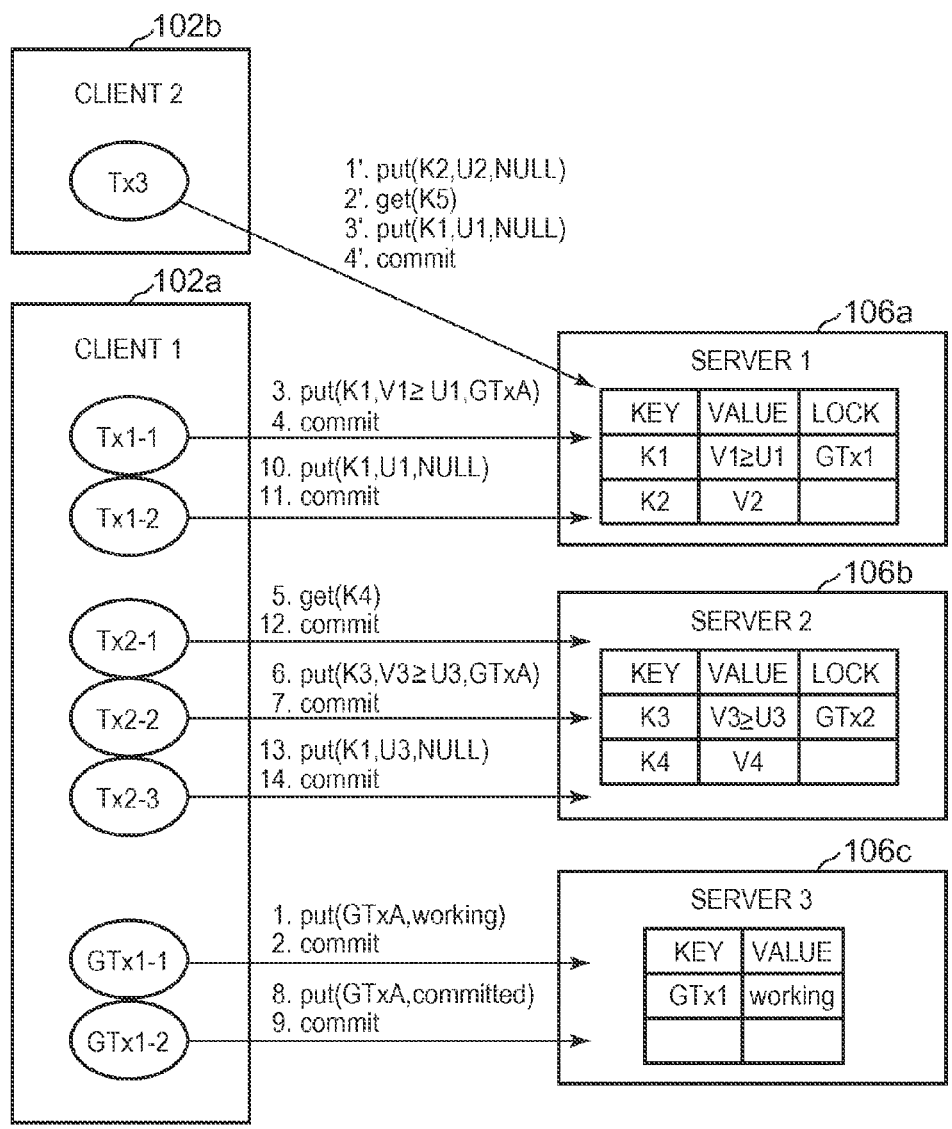
FIG. 7 is a diagram showing an example of processing performed by a conventional KVS system for executing a global transaction according to one embodiment of the present invention.

In order to solve this problem, a KVS system based on two-phase commit to enable a global transaction as shown in FIG. 7 has been developed. In such a system, a read lock is held in a local transaction, and an write lock is held as a map entry value[CURRENT→DIRTY, LOCK] including a transaction ID (LOCK) of a global transaction acquiring the write lock together with a committed value(CURRENT) before being updated and a value (DIRTY) being updated. For convenience sake, the following assumes that each map entry consists of KEY column, VALUE column, and LOCK column, and that (CURRENT→DIRTY) as CURRENT and DIRTY values is stored in the VALUE column and a LOCK value is stored in the LOCK column. When there is no DIRTY value only CURRENT is stored in the VALUE column. Further, in FIG. 7, Tx1-1, Tx1-2, Tx2-1, Tx2-2, Tx2-3, GTX1-1, and GTx1-2 are transaction IDs of local transactions, and GTx1 and GTx2 are transaction IDs of global transactions. The local transactions indicated by Tx1-1, Tx1-2, GTx1-1, and GTx1-2 are local transaction processes for processing the global transaction indicated by GTx1.

In the client computer 102a as client 1, local transaction GTx1-1 first instructs server 3 (server 106c) to execute a commit on the management map after put(GTxA, working).

Then, client 1 instructs server 1 (server 106a) in local transaction Tx1-1 to execute a commit on the data map after put(K1, V1→U1, GTxA).

Next, client 1 instructs server 2 (server 106b) in local transaction Tx2-1 to execute get(K4) on the data map.

Next, client 1 instructs server 2 in local transaction Tx2-2 to execute put(K3, V3→U3, GTxA) on the data map and commit.

Next, client 1 instructs server 3 in local transaction GTx1-2 to execute put(GTxA, committed) on the management map and commit.

Next, client 1 instructs server 1 in local transaction Tx1-2 to execute put(K1, U1, NULL) on the data map and commit.

Next, client 1 instructs server 2 in local transaction Tx2-1 to commit.

Next, client 1 instructs server 2 in local transaction Tx2-3 to execute put(K1, U3, NULL) on the data map and commit.

On the other hand, client 2, i.e., the client computer 102b instructs server 1 in local transaction Tx3 to execute put(K2, U2, NULL), get(K5), put(K1, U1', NULL), and commit on the data map.

In such a configuration, client 1 can atomically update K1 and K3 values, but client 2 is not allowed to update K1 value in a local transaction. This is because client 1 does not hold a lock of a local concurrency control mechanism on server 1 to a map entry for K1 being updated, and hence client 2 can update data on the K1 value. However, in the global transaction process, since client 1 makes an entry of GTxA as a LOCK value, the entry should not be able to be updated essentially. In order to prevent this, all transactions have to be graded up to global transactions. However, since a global transaction realized by multiple local transactions has larger overhead than a local transaction, the performance of the entire system is degraded.

Figure 8:
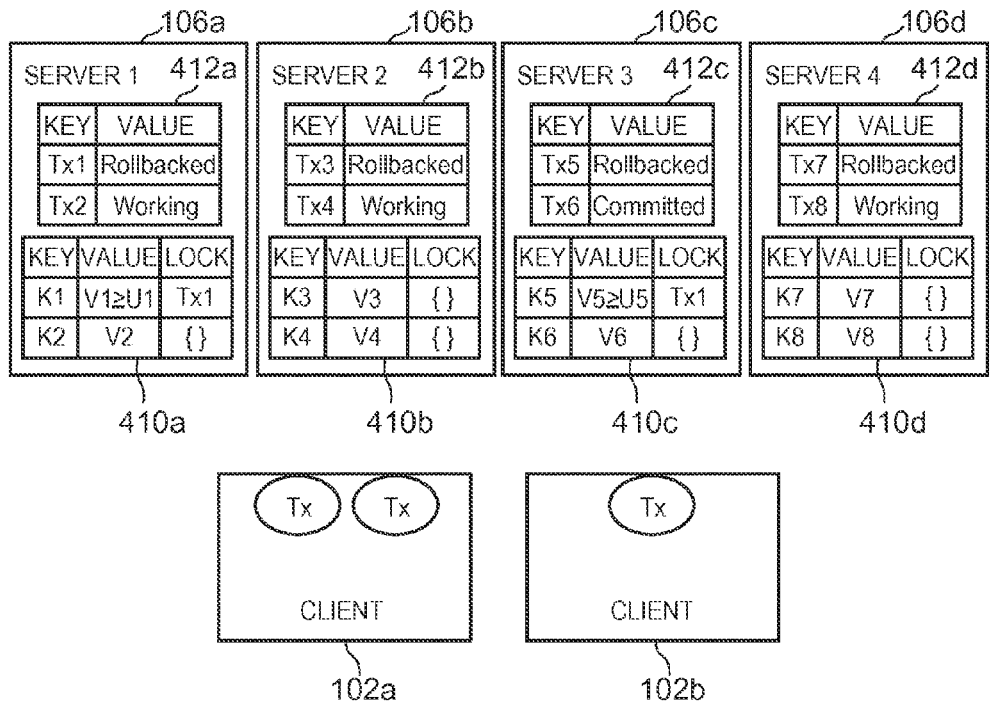
FIG. 8 is a diagram showing an outline of a KVS system according to the present invention according to one embodiment of the present invention.

FIG. 8 shows a configuration according to one embodiment of the present invention. Reference numerals in FIG. 8 correspond to those in the functional block diagram of FIG. 4. As shown, each of management maps 412a, 412b, 412c, and 412d having columns of transaction ID (TxID) and transaction status is provided separately on each of the servers 106a, 106b, 106c, and 106d, respectively, where transaction status is stored in the VALUE column.

Further, each of tables (data map) 410a, 410b, 410c, and 410d for storing KVS data is provided on each of the servers 106a, 106b, 106c, and 106d. Each of the data maps 410a, 410b, 410c, and 410d has a KEY column as a column for making an entry of a key, a VALUE column as a column for making an entry of a committed value or a value being updated, and a LOCK column for storing a lock state, i.e., a transaction ID being updated.

Each of the servers 106a, 106b, 106c, and 106d uses a KVS transaction mechanism for each map entry in the data maps 410a, 410b, 410c, and 410d to manage four lock states. The four lock states are S (being referred by a global transaction or a local transaction), Init (no access), LX (being updated by a local transaction), and GX (being updated by a global transaction). The four lock states make transitions according to a transition diagram of FIG. 9.

In FIG. 8, the client computer 102a requesting a global transaction makes requests for processing multiple local transactions, and the client computer 102b requesting a local transaction makes a request for processing a single local transaction.

Each of the servers 106a, 106b, 106c, and 106d includes a local concurrency control mechanism, not shown, and each of the management map 412a, 412b, 412c, and 412d is placed on each of the servers 106a, 106b, 106c, and 106d, so that read-write conflicts between local transactions, between global transactions, and between a local transaction and a global transaction are resolved by the local concurrency control mechanism, an write-write conflict between global transactions is resolved by using the management map, an write-write conflict between a local transaction and a global transaction is resolved by the local concurrency control mechanism, and an write-read conflict and an write-write conflict between a global transaction and a local transaction are resolved by using the management map after the local transaction is graded up to a global transaction. It is assumed that the local concurrency control mechanism gives a client requesting a local transaction a read lock when Get is requested, an write lock when Put is requested, and an write lock when GetForUpdate is requested.

Figure 9:
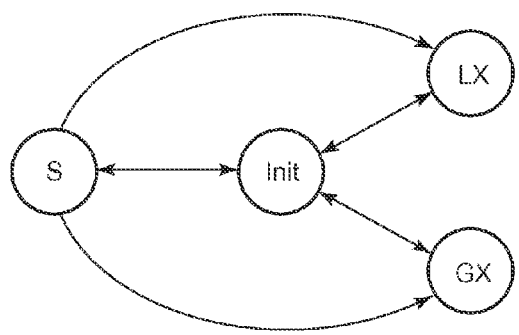
FIG. 9 is a diagram showing state transitions of locks according to one embodiment of the present invention.

Next, the four lock states, i.e., S (being referred to by a global transaction or a local transaction), Init (no access), LX (being updated by a local transaction), and GX (being updated by a global transaction) will be described. As shown in FIG. 9, a transition is made from Init to any of S, LX, and GX.

A transition is made from S to any of In it, LX, and GX. LX and GX can only return to Init.

When a local transaction requests an S lock, the local transaction is started to perform query processing (Get). After it is confirmed that the lock state is not GX, the query processing is performed. When it is GX, the local transaction is graded up to a global transaction to wait as the global transaction until a global transaction making an update is terminated, and after that, it requests S as the global transaction.

When a local transaction requests an LX lock, the local transaction is started to perform query processing (GetForUpdate) that involves acquiring a write lock. After it is confirmed that the lock state is not GX, update processing is performed. When it is GX, the local transaction is graded up to a global transaction to wait until a global transaction making an update is terminated, and after that, it requests GX as the global transaction.

When a local transaction requests Commit/Rollback, Commit/Rollback on the local transaction is executed.

When a global transaction requests an S lock, a local transaction is started, and after it is confirmed that the lock state is not GX, query processing is performed. When it is GX, the local transaction is committed, waiting until a global transaction making an update is terminated.

When a global transaction requests a GX lock, a local transaction is started, and after it is confirmed by using GetForUpdate on the data map that the lock state is Init, update processing for DIRTY of the VALUE column and LOCK column in the map entry is performed and the local transaction is committed. When it is GX, the local transaction is committed, waiting until a global transaction making an update is terminated.

When a global transaction requests Commit from GX, a local transaction is started to update CURRENT→DIRTY in the VALUE column to DIRTY, delete the LOCK column, and commit the local transaction.

When a global transaction requests Rollback from GX, a local transaction is started to delete DIRTY in the VALUE column, delete the LOCK column, and commit the local transaction.

Next, processing performed on a server in accordance with instructions from a client computer will be described with reference to flowcharts. In the following, particularly for convenience in describing the flowcharts, terms can be abbreviated as follows: transaction ID as TxID, local transaction as LocalTx, and global transaction as GlobalTx.

Figure 10:
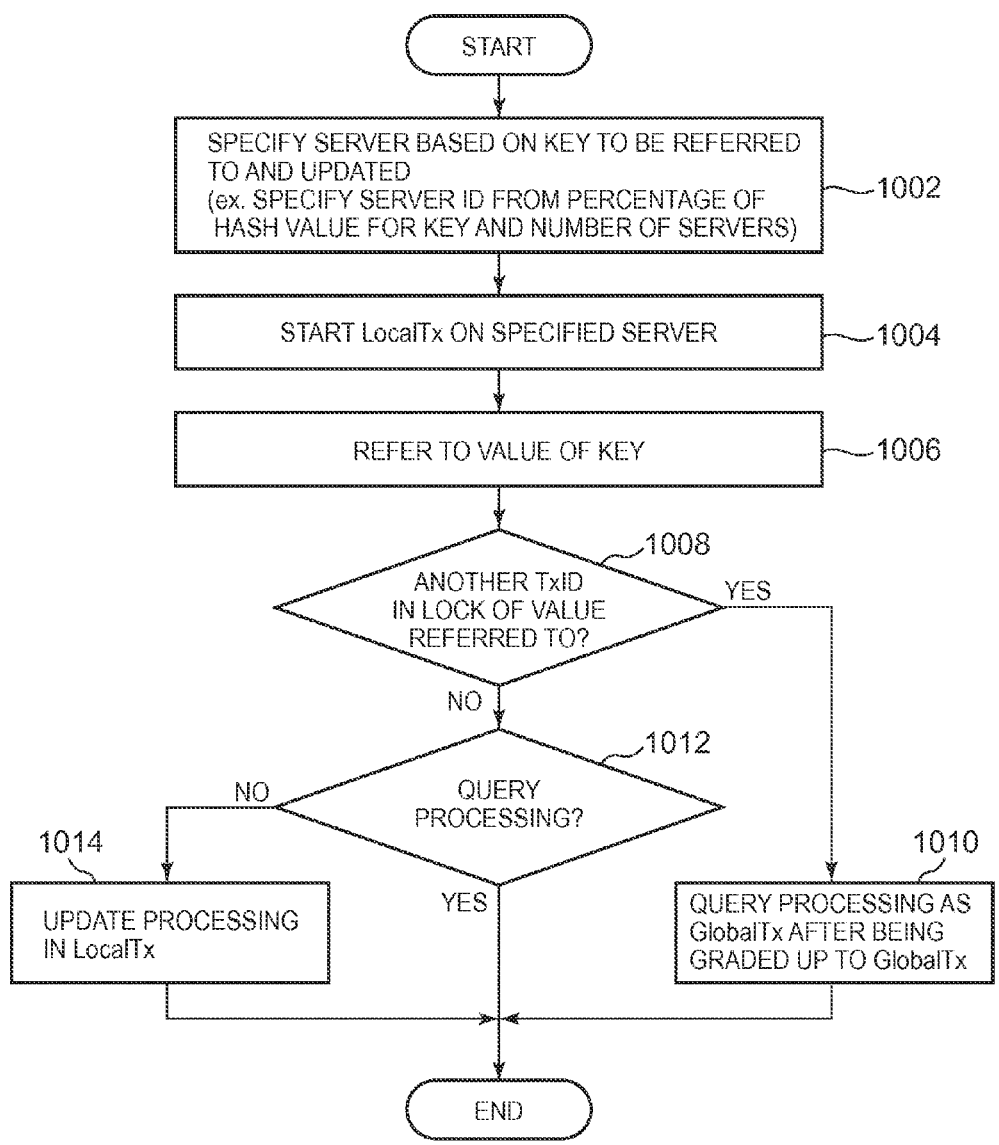
FIG. 10 is a flowchart showing processing when a transaction performs query/update processing for the first time according to one embodiment of the present invention.

FIG. 10 is a flowchart showing processing when a transaction performs query/update processing for the first time.

In step 1002, in response to a request from a transaction, a server is specified based on a key to be referred to and updated, for example, by once accessing a catalog server. To this end, for example, a server ID is specified from a value as the remainder obtained by dividing a hash value for the key by the number of servers.

In step 1004, the specified server starts a local transaction. In step 1006, the specified server refers to a value corresponding to the key, and in step 1008, determines whether there is another transaction ID in the LOCK column of the map entry referred to. If so, query processing is performed as a global transaction after being graded up to the global transaction in step 1010. Specific processing for grading up the transaction to a global transaction will be described later with reference to a flowchart of FIG. 13.

When it is determined in step 1008 that there is no other transaction ID in the LOCK column of the value referred to, it is then determined in step 1012 whether the processing is query processing, or if not so, update processing is performed in step 1014 as a local transaction. Here, LOCK means a value in the LOCK column of each of the data tables 410a, . . . , or the like.

Figure 11:
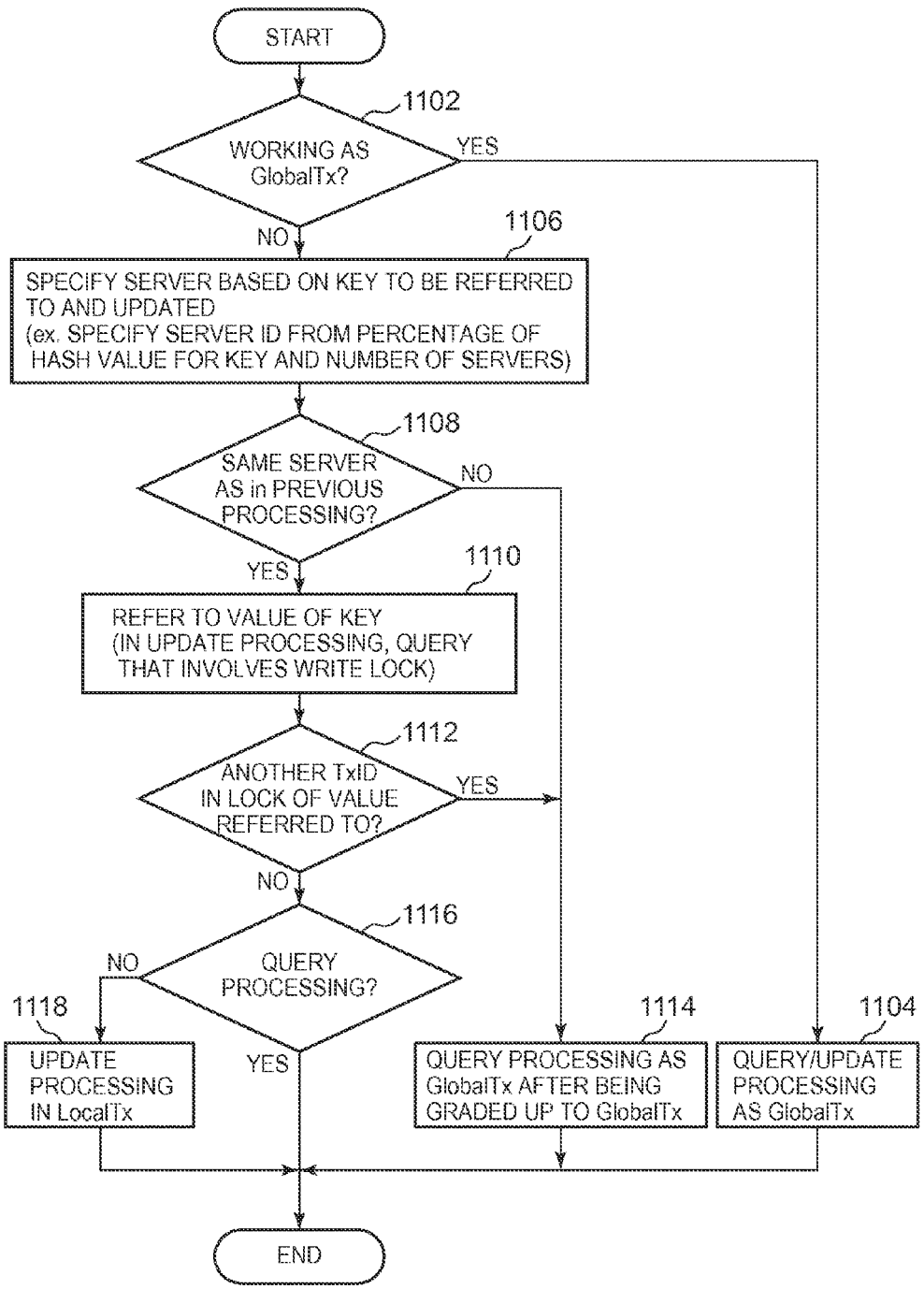
FIG. 11 is a flowchart showing processing when the transaction performs query/update processing for the second and subsequent times according to one embodiment of the present invention.

FIG. 11 is a flowchart showing processing when the transaction performs query/update processing for the second and subsequent times according to one embodiment of the present invention.

In step 1102, it is determined whether the transaction is working as a global transaction. If so, query/update processing is performed in step 1104 as the global transaction.

If it is not working as a global transaction, a server is specified in step 1106 based on a key to be referred to and updated, for example, by once accessing a catalog server. To this end, for example, a server ID is specified from a value as the remainder obtained by dividing a hash value for the key by the number of servers.

In step 1108, it is determined whether the server is the same as that in the previous processing, and if so, the specified server refers to a value corresponding to the key in step 1110. In this case, when the processing is update processing, it is query processing (GetForUpdate) that involves a write lock.

In step 1112, the specified server determines whether there is another transaction ID (TxID) in the lock of the value referred to. If so, query processing is performed in step 1114 as a global transaction after being graded up to the global transaction.

When it is determined in step 1112 that there is no other transaction ID in the lock of the value referred to, it is determined in step 1116 whether the processing is query processing, and if not, update processing is performed in step 1118 as a local transaction.

Returning to step 1108, when it is determined that the server is not the same as that in the previous processing, query processing is performed in step 1114 as a global transaction after being graded up to the global transaction.

Figure 12:
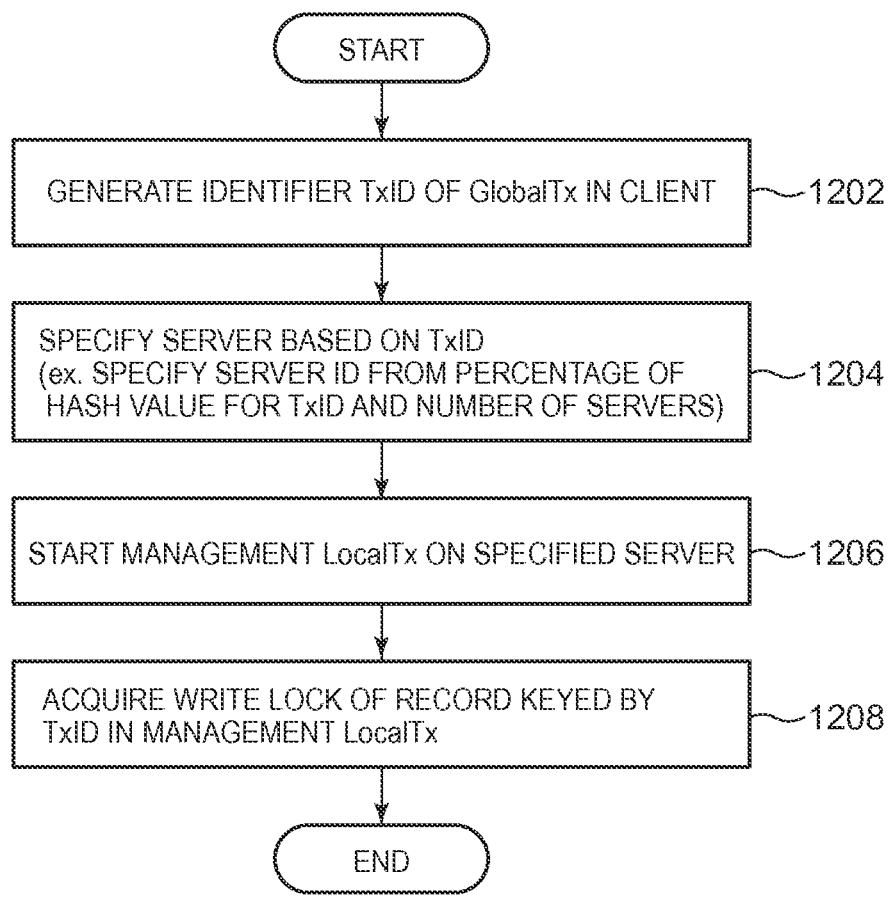
FIG. 12 is a flowchart showing start processing for a global transaction according to one embodiment of the present invention.

FIG. 12 is a flowchart showing start processing for a global transaction according to one embodiment of the present invention.

In step 1202, a transaction ID as an identifier of a global transaction is generated in a client.

In step 1204, a server is specified based on the transaction ID. In this case, for example, a server ID is specified from a value as the remainder obtained by dividing a hash value for the transaction ID by the number of servers.

In step 1206, a management local transaction is started on the specified server. Then, in step 1208, a write lock of a map entry keyed by the transaction ID is acquired in the management local transaction.

Figure 13:
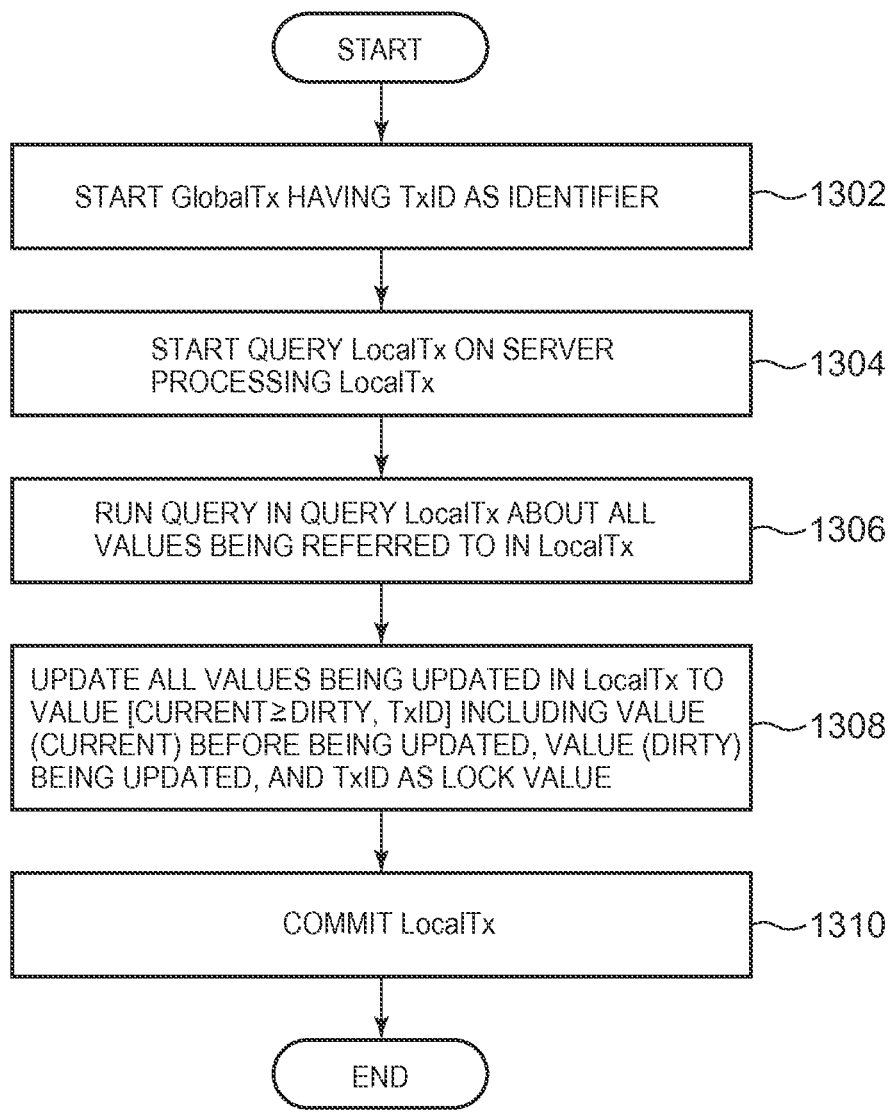
FIG. 13 is a flowchart showing processing for grading up from a local transaction to a global transaction according to one embodiment of the present invention.

FIG. 13 is a flowchart showing processing for grading up from a local transaction to a global transaction according to one embodiment of the present invention.

In step 1302, a global transaction having a transaction ID as its identifier is started.

In step 1304, a query local transaction is started on the server processing the local transaction.

In step 1306, a query in the query local transaction is run about all values being referred to in the local transaction, i.e., for which S locks are being acquired.

In step 1308, all values being updated in the local transaction, i.e., for which LX locks are being acquired are updated to value[CURRENT→DIRTY, LOCK] obtained by combining a value (CURRENT) before being updated, a value (DIRTY) being updated, and a transaction ID (LOCK) for which an write lock is being acquired. Here, the LOCK value means a value in the LOCK column such as on the data table 410a, . . . , or the like.

In step 1310, the original local transaction is committed. Thus, the acquired LX lock is graded up to a GX lock. Note that the query local transaction is not committed at this point.

Figure 14:
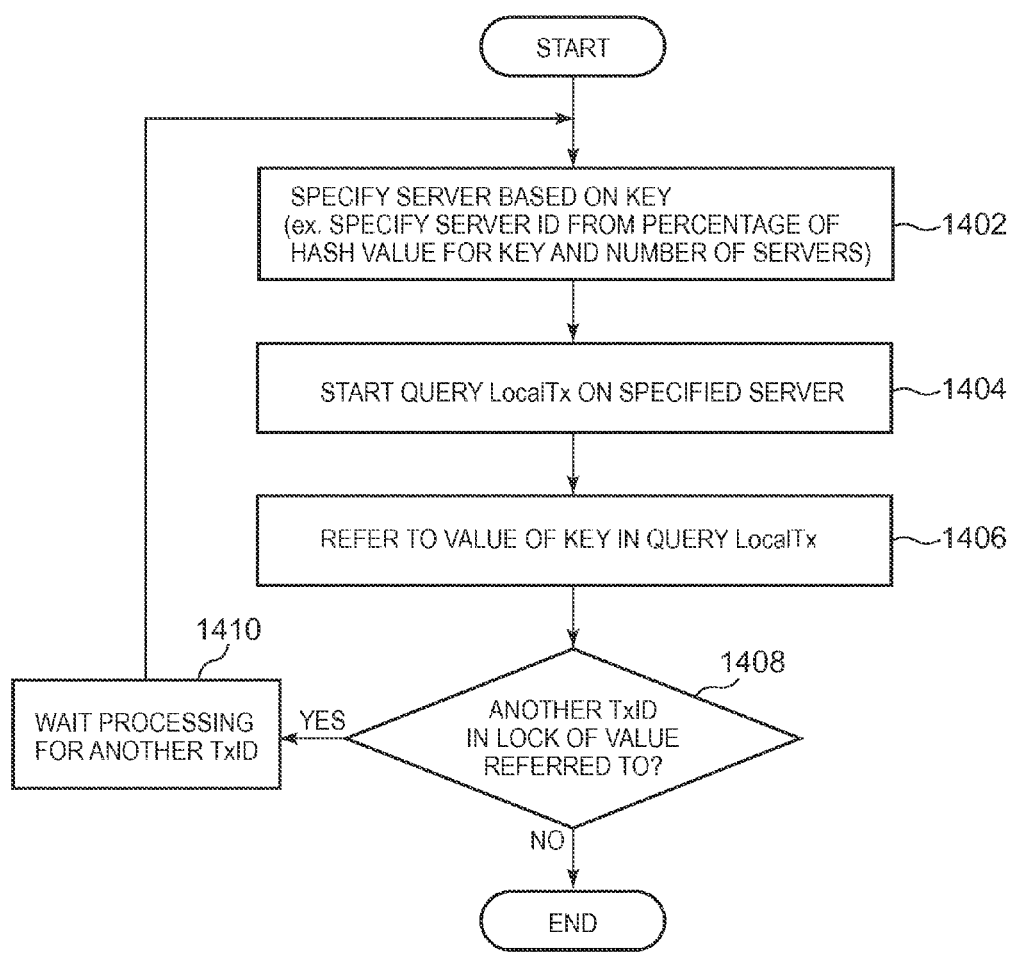
FIG. 14 is a flowchart showing query processing in a global transaction according to one embodiment of the present invention.

FIG. 14 is a flowchart showing query processing in a global transaction according to one embodiment of the present invention. In step 1402, a server is specified based on a key. To this end, for example, a server ID is specified from a value as the remainder obtained by dividing a hash value for the key by the number of servers.

In step 1404, a query local transaction is started on the specified server.

In step 1406, a value corresponding to the key is referred to in the query local transaction.

In step 1408, it is determined whether there is another transaction ID in the LOCK value of the value referred to, and if so, wait processing for another transaction ID is performed in step 1410, and the procedure returns to step 1402.

When there is no other transaction ID in the LOCK value of the value referred to, the processing is ended without committing the query local transaction at this point.

Figure 15:
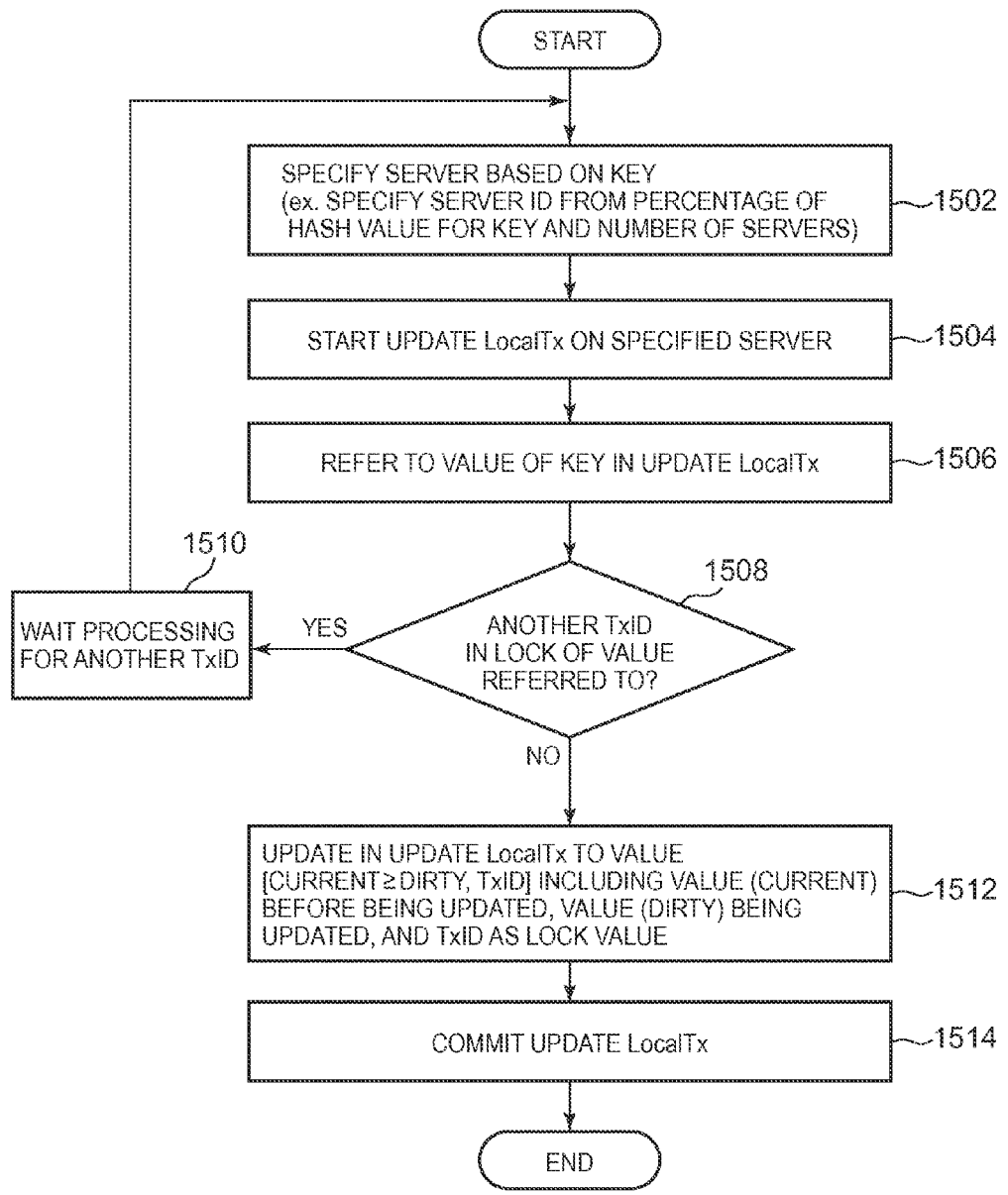
FIG. 15 is a flowchart showing update processing in a global transaction according to one embodiment of the present invention.

FIG. 15 is a flowchart showing update processing in a global transaction according to one embodiment of the present invention. In step 1502, a server is specified based on a key. To this end, for example, a server ID is specified from a value as the remainder obtained by dividing a hash value for the key by the number of servers.

In step 1504, an update local transaction is started on the specified server.

In step 1506, a value corresponding to the key is referred to in the update local transaction.

In step 1508, it is determined whether there is another transaction ID in the LOCK value of the value referred to, and if so, wait processing for another transaction ID is performed in step 1510, and the procedure returns to step 1502.

When there is no other transaction ID in the LOCK value of the value referred to, an update to value [CURRENT→DIRTY, TxID] obtained by combining a value (CURRENT) before being updated, a value (DIRTY) being updated, and a transaction ID (TxID) for which an write lock is being acquired is made in step 1512 in the update local transaction.

In step 1514, the update local transaction is committed.

Figure 16:
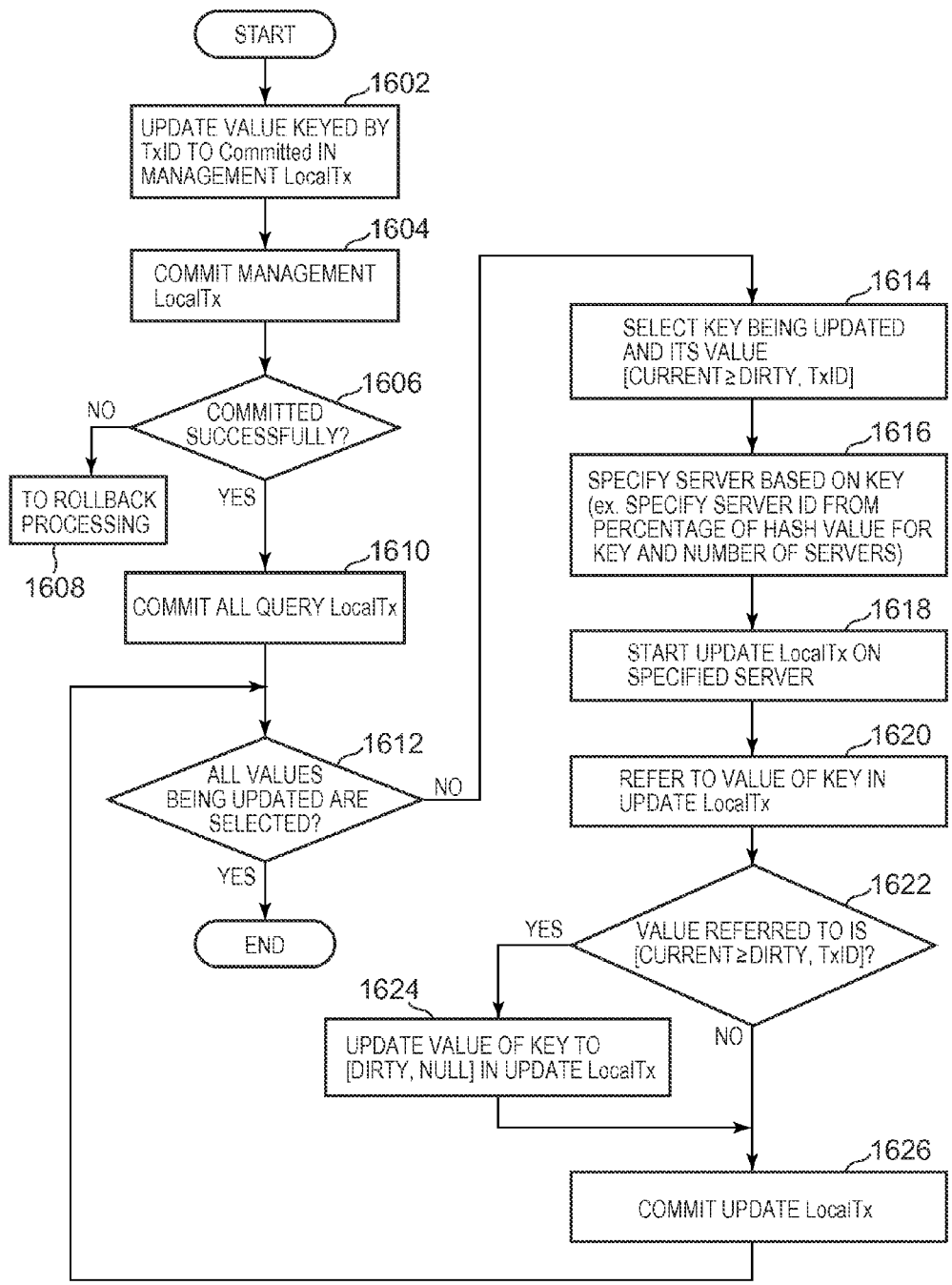
FIG. 16 is a flowchart showing commit processing in a global transaction according to one embodiment of the present invention.

FIG. 16 is a flowchart showing commit processing in a global transaction according to one embodiment of the present invention. In step 1602, a corresponding server updates a value keyed by a transaction ID of a management map to Committed in a management local transaction.

The server commits the management local transaction in step 1604.

In step 1606, it is determined whether the commit is executed successfully, and if not, a rollback is executed in step 1608.

When it is determined in step 1606 that the commit is executed successfully, all ready local transactions are committed in step 1610.

In step 1612, it is determined whether all VALUEs being updated are selected, and if so, the processing is ended.

When all VALUEs being updated are not selected yet, a KEY being updated and its value [CURRENT→DIRTY, TxID] are selected in step 1614.

In step 1616, a server is specified based on the key. To this end, for example, a server ID is specified from a value as the remainder obtained by dividing a hash value for the key by the number of servers.

In step 1618, an update local transaction is started on the specified server according to one embodiment of the present invention.

In step 1620, a value corresponding to the key is referred to in the update local transaction.

In step 1622, it is determined whether the value referred to is [CURRENT→DIRTY, TxID], and if so, the value corresponding to the key is updated to [DIRTY, NULL] in step 1624 in the update local transaction, the update local transaction is committed in step 1626, and the procedure returns to step 1612.

In step 1622, when the value referred to is not [CURRENT→DIRTY, TxID], the update local transaction is committed immediately in step 1626, and the procedure returns to step 1612.

Figure 17:
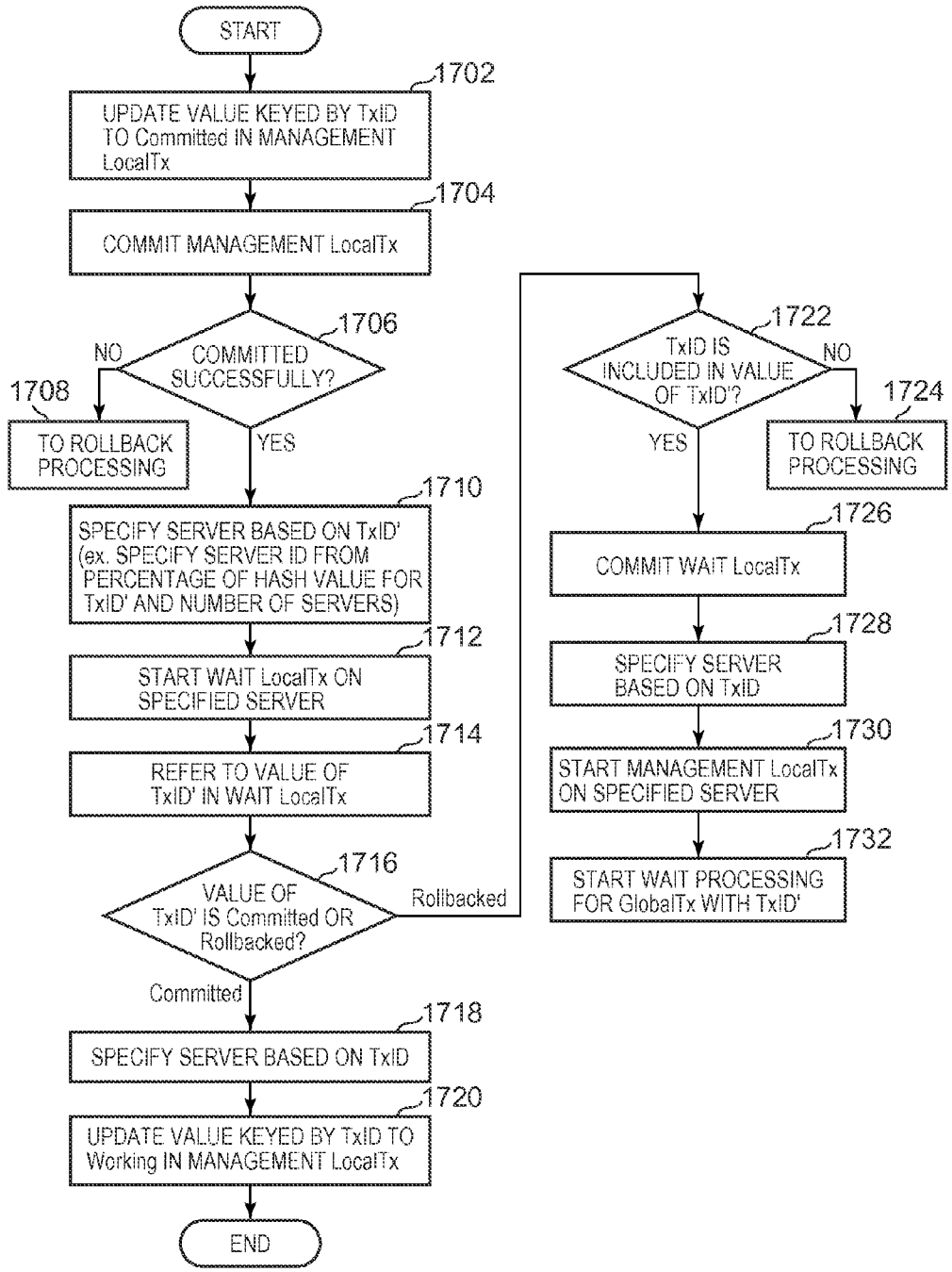
FIG. 17 is a flowchart showing wait processing for a global transaction according to one embodiment of the present invention.

FIG. 17 is a flowchart showing wait processing for a global transaction having transaction ID TxID' as its identifier according to one embodiment of the present invention.

In step 1702, processing for updating a value keyed by transaction ID TxID to [Waiting, TxID'] is performed in a management local transaction.

In step 1704, the management local transaction is committed.

In step 1706, it is determined whether the commit is executed successfully, and if not, a rollback is executed in step 1708.

When it is determined in step 1706 that the commit is executed successfully, a server is specified in step 1710 based on TxID'. For example, this is decided by a value obtained by dividing a hash value for TxID' by the number of servers.

In step 1712, a wait local transaction is started on the specified server.

In step 1714, a value of TxID' is referred to on a management map in the wait local transaction.

In step 1716, it is determined whether the value of TxID' is either Committed or Rollbacked. When it is Committed, a server is specified in step 1718 based on TxID, a value keyed by TxID is updated to Working in step 1720 in the management local transaction, and the processing is ended.

On the other hand, when the value of TxID' is Rollbacked, it is determined in step 1722 whether TxID is included in the value of TxID', and if not, the procedure proceeds in step 1724 to rollback processing.

When it is determined in step 1722 that TxID is included in the value of TxID', the wait local transaction is committed in step 1726. Then, in step 1728, a server is specified based on TxID, and a management local transaction is started on the specified server in step 1730.

Then, in step 1732, wait processing for a global transaction with TxID' is started.

Figure 18:
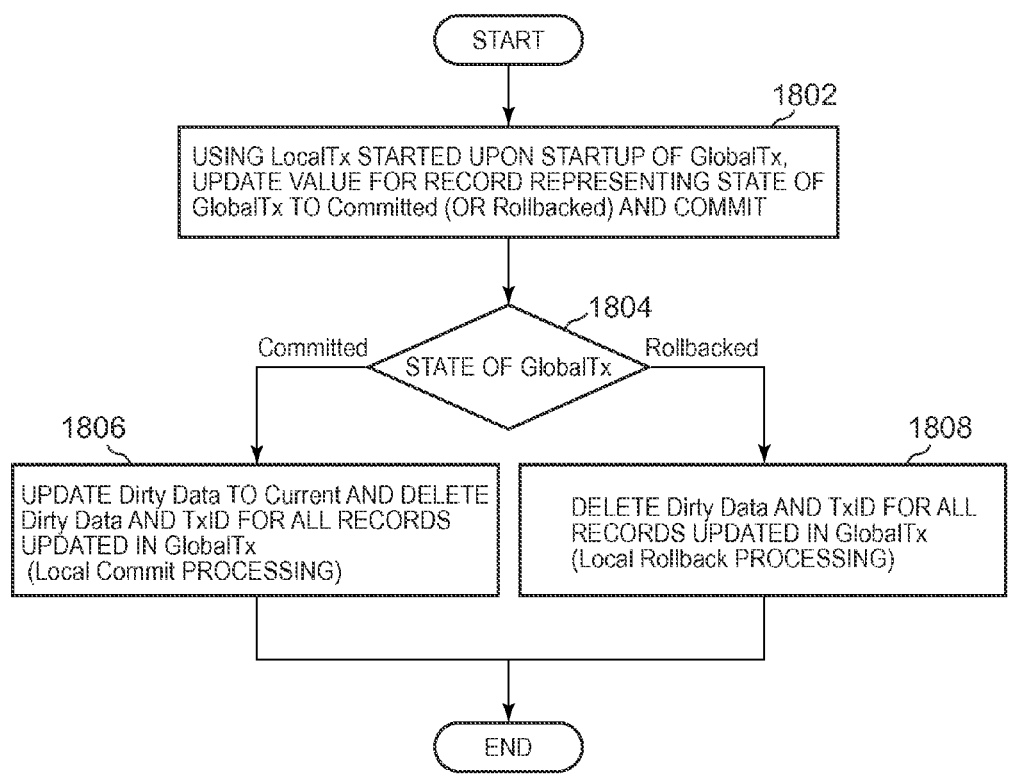
FIG. 18 is a flowchart showing termination processing for a global transaction according to one embodiment of the present invention.

FIG. 18 is a flowchart showing termination processing for a global transaction according to one embodiment of the present invention.

In step 1802, using a local transaction started upon startup of a global transaction, a value for a map entry representing the state of a global transaction is updated to Committed or Rollbacked, and committed.

In step 1804, the procedure branches depending on whether the state of the global transaction is Committed or Rollbacked. When it is Committed, CURRENT→DIRTY in the VALUE column is updated to DIRTY in step 1806 for all map entries updated in the global transaction, and processing for deleting the LOCK column is performed (local commit). On the other hand, when it is Rollbacked, processing for deleting DIRTY in the VALUE column and the LOCK column is performed in step 1808 for all map entries updated in the global transaction (local rollback).

Next, processing during client failures will be described.

First, when a failure occurs in a client before a global transaction is committed, each map entry remains intact in GX state. Then, a local transaction for a map entry on a management map representing the state of the global transaction is rollbacked by the server, getting into a state in which the state is no longer stored. A transaction for referring to and updating the map entry next time can check on the management map to check whether the transaction is rollbacked. If it is rollbacked, local rollback processing is performed by the transaction that has checked that it is rollbacked.

Next, when a failure occurs in a client before local commit processing, each map entry remains intact in GX state. A transaction for referring to and updating the map entry next time can check on the management map to check whether the transaction is committed. When it is committed, local commit processing is performed by the transaction that has checked that it is committed.

Thus, both when a failure occurs in a client before a global transaction is committed and when a failure occurs in a client before local commit processing, processing consistency can be kept according to the present invention.

Figure 19:
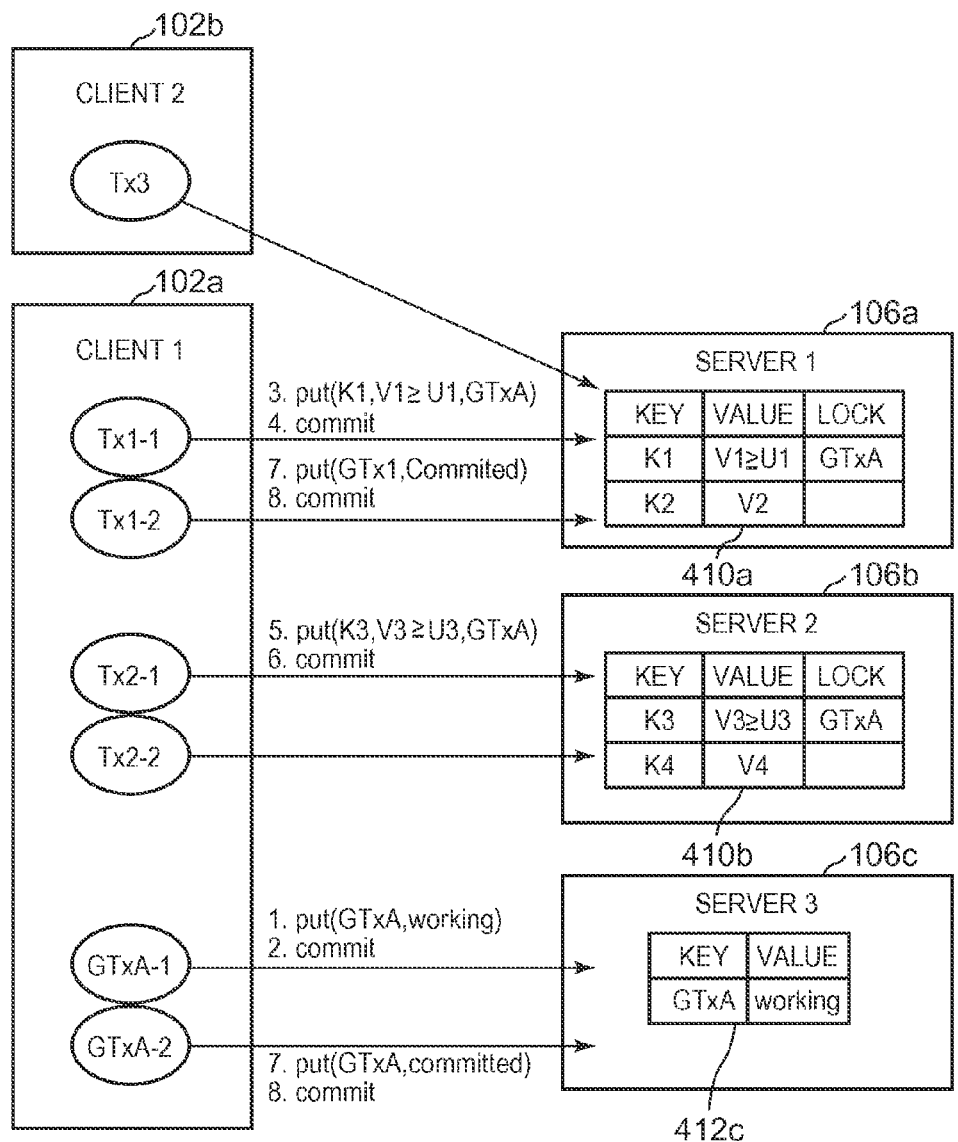
FIG. 19 is a diagram showing an example of the operation of the KVS system according to one embodiment of the present invention.

Referring next to FIG. 19, an example of the operation of this embodiment of the present invention will be described. First, in FIG. 19, global transaction GTxA-1 of client 1 (client computer 102a) instructs server 3 (server 106c) to execute put(GTxA, working), and then to commit.

Next, local transaction Tx1-1 of client 1 instructs server 1 (server 106a) to execute put(K1, V1→U1, GTxA), and then to commit.

Next, local transaction Tx2-1 of client 1 instructs server 2 (server 106b) to execute put(K3, V3→U3, GTxA), and then to commit.

Next, local transaction Tx1-2 of client 1 instructs server 1 to execute put(GTx1, committed), and then to commit. At the same time, global transaction GTxA-1 of client 1 instructs server 3 to execute put(GTxA, committed), and then to commit.

In this period, local transaction Tx3 of client 2 (client computer 102b) tries to execute GetForUpdate(K1) on server 1. Processing in this case varies depending on when any other global transaction takes no write lock or when any other global transaction takes a write lock.

When any other global transaction takes no write lock, the following processes are executed:
Tx3-1'. getForUpdate(K2)
Tx3-2'. put(K2, U2, NULL)
Tx3-3'. get(K5)
Tx3-4'. getForUpdate(K1)
Tx3-5'. put(K1, U1', NULL)
Tx3-6'. commit When any other global transaction takes a write lock, the following processes are executed:
Tx3-1'. getForUpdate(K2)
Tx3-2'. put(K2, U2, NULL)
Tx3-3'. get(K5)
Tx3-4'. getForUpdate(K1)
Tx3-5'. put(K2, V2→U2, GTxB)//graded up from Tx3 to GTxB
Tx4-1'. get(K5)//start Tx4 to query map entries being queried again
Tx3-6'. commit
Wait for GTxA commit/rollback//wait for termination of GTxA
Tx5-1'. put(K1, U1→U1', GTxB)//in an existing transaction, modify, for a global transaction, write locks of map entries being updated While the embodiment of the present invention is described based on the platform of specific hardware and software, it will be understood by those skilled in the art that the present invention can be carried out in any computer hardware and computer platform.

The invention claimed is:

1. A method for distributing data to a plurality of servers on which data is accessed from a client computer, the method comprising:
   placing, on each of the plurality of servers, a management table comprising a transaction ID and a value indicative of a state thereof, and a data table comprising a key value, a value, and a lock value;
   determining a transaction ID on the client computer to start a global transaction;
   starting a query local transaction on a server processing a local transaction among the plurality of servers;
   running a query in the query local transaction about all values being referred to in the local transaction;
   updating all values being updated in the local transaction to a combination of a value before being updated, a value being updated, and the transaction ID as a lock value on the data table; and
   committing the local transaction;
   wherein the step of starting the global transaction comprises:
   causing the client computer to generate the transaction ID;
   determining a server holding a management map representing a state of the global transaction based on the transaction ID; and
   starting a local transaction for map entries on the management map representing the state of the global transaction to acquire a lock;
   using the local transaction to change values of the map entries on the management map representing the state of the global transaction to Committed and to commit; and
   changing data being updated to current data for all map entries updated in the global transaction and executing a step of deleting data being updated and transaction IDs to terminate the global transaction.

2. The method according to claim 1, wherein the query local transaction is not committed at a point of committing the local transaction.

3. The method according to claim 1, wherein the lock has an S lock indicative of being referred to by a global transaction or a local transaction, an LX lock indicative of being updated by a local transaction, and a GX lock indicative of being updated by a global transaction.

4. The method according to claim 1, further comprising:
   using the local transaction to change values of the map entries on the management map representing the state of the global transaction to Rollbacked and to commit; and
   executing a step of deleting data being updated and transaction IDs on all map entries updated in the global transaction to terminate the global transaction.

5. A non-transitory computer program product for a distributed Key-Value Store (KVS) system distributing data to a plurality of servers on which the data is accessed from a client computer, the computer program product causing the distributed KVS system to execute:
   placing, on each of the plurality of servers, a management table comprising a transaction ID and a value indicative of a state thereof, and a data table comprising a key value, a value, and a lock value;
   determining a transaction ID on the client computer to start a global transaction;
   starting a query local transaction on a server processing a local transaction among the plurality of servers;
   running a query in the query local transaction about all values being referred to in the local transaction;

updating all values being updated in the local transaction to a combination of a value before being updated, a value being updated, and the transaction ID as a lock value on the data table; and committing the local transaction;

causing the client computer to generate the transaction ID;

determining a server holding a management map representing a state of the global transaction based on the transaction ID; and starting a local transaction for map entries on the management map representing the state of the global transaction to acquire a lock;

using the local transaction to change values of the map entries on the management map representing the state of the global transaction to Committed and to commit; and changing data being updated to current data for all map entries updated in the global transaction and executing a step of deleting data being updated and transaction IDs to terminate the global transaction.

6. The computer program product according to claim 5, wherein the query local transaction is not committed at a point of committing the local transaction.

7. The computer program product according to claim 5, wherein the lock has an S lock indicative of being referred to by a global transaction or a local transaction, an LX lock indicative of being updated by a local transaction, and a GX lock indicative of being updated by a global transaction.

8. The computer program product according to claim 5, further causing the distributed KVS system to execute:

using the local transaction to change values of the map entries on the management map representing the state of the global transaction to Rollbacked and to commit; and executing a step of deleting data being updated and transaction IDs on all map entries updated in the global transaction to terminate the global transaction.

9. A system, having a processor and memory, for a distributed Key-Value Store (KVS system distributing data to a plurality of servers on which the data is accessed from a client computer, the system comprising:

means for placing, on each of the plurality of servers, a management table comprising a transaction ID and a value indicative of a state thereof, and a data table comprising a key value, a value, and a lock value;

means for determining a transaction ID on the client computer to start a global transaction;

means for starting a query local transaction on a server processing a local transaction among the plurality of servers;

means for running a query in the query local transaction about all values being referred to in the local transaction;

means for updating all values being updated in the local transaction to a combination of a value before being updated, a value being updated, and the transaction ID as a lock value on the data table;

means for committing the local transaction;

means for causing the client computer to generate the transaction ID;

means for determining a server holding a management map representing a state of the global transaction based on the transaction ID;

means for starting a local transaction for map entries on the management map representing the state of the global transaction to acquire a lock;

means for using the local transaction to change values of the map entries on the management map representing the state of the global transaction to committed and to commit; and means for changing data being updated to current data for all map entries updated in the global transaction and executing a step of deleting data being updated and transaction IDs to terminate the global transaction.

10. The system according to claim 9, wherein the query local transaction is not committed at a point of committing the local transaction.

11. The system according to claim 9, wherein the lock has S lock indicative of being referred to by a global transaction or a local transaction, LX lock indicative of being updated by a local transaction, and GX lock indicative of being updated by a global transaction.

12. The system according to claim 9, further comprising:

means for using the local transaction to change values of the map entries on the management map representing the state of the global transaction to Rollbacked and to commit; and means for executing means for deleting data being updated and transaction IDs on all map entries updated in the global transaction to terminate the global transaction.

* * * * *